(12) United States Patent
Llamas

(10) Patent No.: US 9,697,044 B2
(45) Date of Patent: *Jul. 4, 2017

(54) APPLICATION PROGRAMMING INTERFACE TO ENABLE THE CONSTRUCTION OF PIPELINE PARALLEL PROGRAMS

(71) Applicant: NVIDIA CORPORATION, Santa Clara, CA (US)

(72) Inventor: Ignacio Llamas, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 1008 days.

This patent is subject to a terminal disclaimer.

(21) Appl. No.: 13/899,343

(22) Filed: May 21, 2013

(65) Prior Publication Data

US 2014/0351827 A1 Nov. 27, 2014

(51) Int. Cl.
*G06F 7/38* (2006.01)
*G06F 9/26* (2006.01)
*G06F 9/48* (2006.01)

(52) U.S. Cl.
CPC .................. *G06F 9/4881* (2013.01)

(58) Field of Classification Search
CPC ................... G06F 9/3851; G06T 1/20
See application file for complete search history.

(56) References Cited

U.S. PATENT DOCUMENTS

| | | | |
|---|---|---|---|
| 2003/0009648 A1* | 1/2003 | Doing | G06F 9/3804 711/202 |
| 2007/0204137 A1* | 8/2007 | Tran | G06F 9/30181 712/214 |
| 2011/0072235 A1* | 3/2011 | Deming | G06F 12/1027 711/207 |
| 2014/0351826 A1* | 11/2014 | Llamas | G06F 15/76 718/107 |

* cited by examiner

*Primary Examiner* — Hyun Nam
(74) *Attorney, Agent, or Firm* — Artegis Law Group, LLP

(57) ABSTRACT

An application programming interface (API) provides various software constructs that allow a developer to assemble a processing pipeline having arbitrary structure and complexity. Once assembled, the processing pipeline is configured to include a set of interconnected pipestages. Those pipestages are associated with one or more different CTAs that may execute in parallel with one another on a parallel processing unit. The developer specifies the configuration of the pipestages, including the configuration of the different CTAs across all pipestages, as well as the different processing operations performed by each different CTA.

18 Claims, 11 Drawing Sheets

APPLICATION PROGRAMMING INTERFACE TO ENABLE THE CONSTRUCTION OF PIPELINE PARALLEL PROGRAMS

BACKGROUND OF THE INVENTION

Field of the Invention

Embodiments of the present invention generally relate to parallel processing and, more specifically, to an application programming interface (API) to enable the construction of pipeline parallel programs.

Description of the Related Art

APIs for GPUs fall into two major categories: traditional raster graphics APIs, such as Open Graphics Library (OpenGL) and Direct3D, and compute APIs, such as C with compute unified device architecture (CUDA) extensions, Open Computing Language (OpenCL), DirectCompute, and C++ accelerated massive parallelism (AMP).

Traditional raster graphics APIs provide a high-level hardware abstraction that exposes a graphics pipeline to developers. The graphics pipeline includes a predetermined sequence of stages that can be executed in parallel to process a collection of graphics primitives that flow through the pipeline. Modern raster graphics APIs allow developers to add a variety of state settings and programmable shader stages to the graphics pipeline, thereby increasing the flexibility with which the pipeline may be programmed. However, the overall structure of the pipeline is essentially fixed and subject to a wide variety of other limitations. For example, a given stage may be capable of executing only certain types of algorithms, and not others. Consequently, traditional raster graphics APIs may only be relied upon for generating a limited variety of graphics processing pipelines.

Traditional compute APIs provide a different abstraction than that provided by traditional raster graphics APIs by only exposing a subset of the GPU hardware compared to that exposed by raster graphics APIs. With compute APIs, only the programmable data-parallel cores that execute the shader stages associated with the graphics pipeline mentioned above are available for programming. However, these parallel cores are exposed via a highly constrained execution model referred to as a "bulk synchronous" execution model. In this type of model, a sequence of kernels may be executed, although between kernels, any shared (on-chip) memory or caches used by a previous kernel must be flushed. This constraint often results in redundant memory load operations between kernels that require similar memory resources. Additionally, with the bulk synchronous programming model, all of the threads associated with a given kernel must complete before a subsequent kernel may be executed, which presents an additional constraint to developers. Lastly, compute APIs are typically provided with few synchronization mechanisms, which makes the development of certain types of programs infeasible.

In recent years, various attempts have been made to program GPUs to implement processing pipelines of arbitrary structure and complexity. Such a pipeline would, ideally, be capable of exhibiting braided parallelism with ordering requirements. However, traditional raster graphics APIs are poorly suited for such functionality due to the inflexibilities of those APIs discussed above. Likewise, traditional compute APIs only provide limited access the GPU hardware, and that access is far too constrained to provide a reasonable framework from which to implement a processing pipeline of arbitrary structure and complexity.

As the foregoing illustrates, what is needed in the art is an API for programming GPUs that allows developers to generate processing pipelines having greater complexity and architectural variation relative to graphics processing pipelines generated using conventional APIs.

SUMMARY OF THE INVENTION

One embodiment of the present invention includes a computer-implemented method for executing a plurality of cooperative thread arrays (CTAs) in parallel with one another, including causing a first CTA to be launched on a first processing core, where the first CTA is associated with a first pipestage that is configured according to first configuration data and included within a processing pipeline, causing a second CTA to be launched on a second processing core, where the second CTA is associated with a second pipestage that is configured according to second configuration data and included within the processing pipeline, and causing the first CTA and the second CTA to be executed in parallel, where the first CTA executes according to the first configuration data and the second CTA executes according to the second configuration data, and where the first configuration data is different than the second configuration data.

One advantage of the disclosed technique is that a developer is provided with a highly flexible framework within which processing pipelines of arbitrary structure and complexity may be generated for execution on a parallel processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
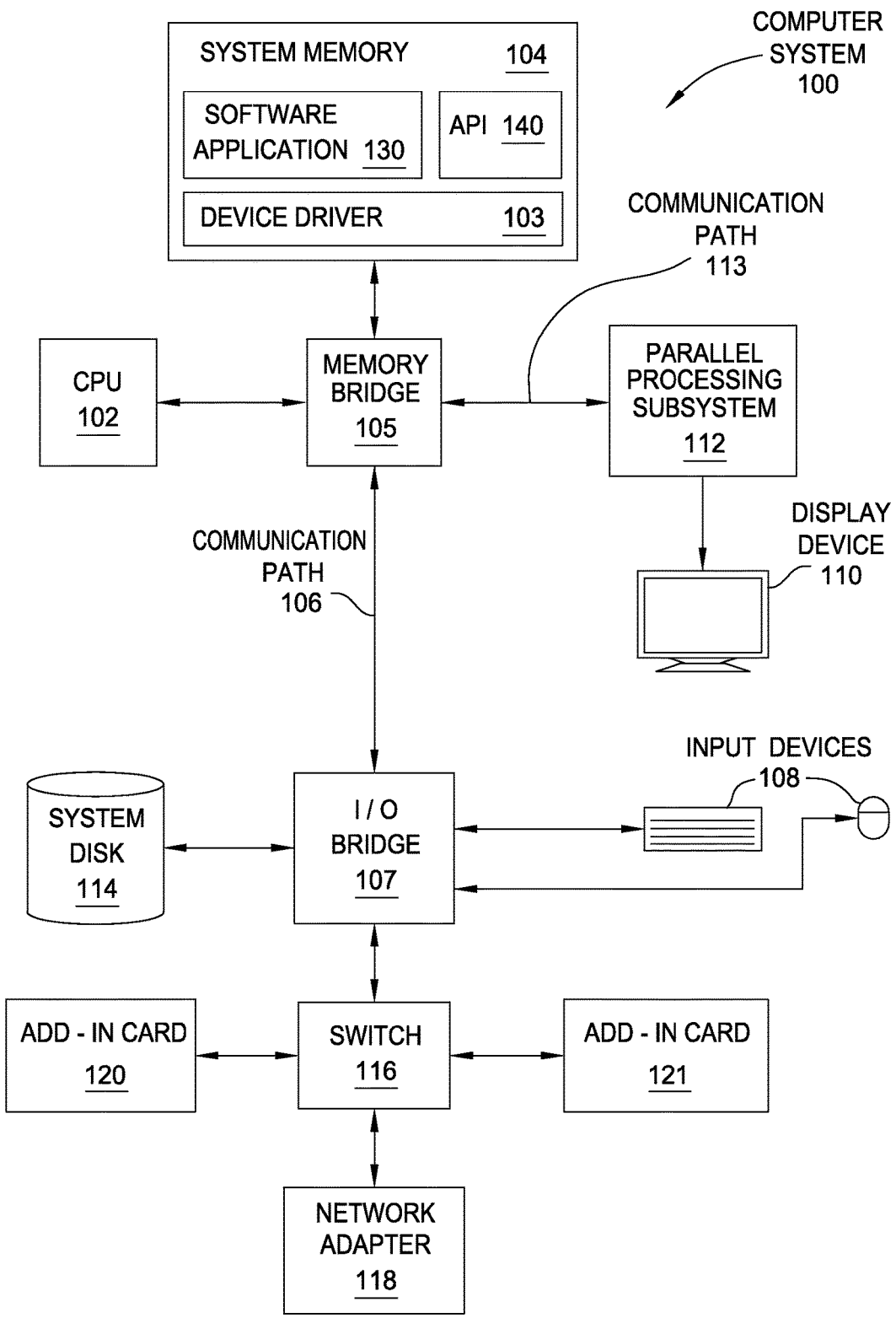
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. System memory 104 includes device driver 103, software application 130, and application programming interface (API) 140, discussed in greater detail below. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Device driver 103 is a software application that may be executed by CPU 103 to manage the operation of parallel processing subsystem 112. Software application 130 includes program code that may be executed by CPU 102, and also includes program code that may be executed by various parallel processing units (PPUs) included within parallel processing subsystem 112. Those PPUs are discussed in greater detail below in conjunction with FIG. 2. When executed by CPU 102, software application 130 may interact with device driver 103 in order to execute program code on the PPUs within parallel processing subsystem 112. Software application 130 may also include calls to various extensions included within API 140.

API 140 is a software application that includes a library of extensions that may be executed by the PPUs within parallel subsystem 112. Those extensions could be written in, for example, the C programming language. A developer may write software application 130 to perform a specific set of operations that rely on the extensions included within API 140. When executed by CPU 102 and/or PPUs within parallel processing subsystem 112, software application 130 may cause various portions of API 140 to be executed by those PPUs. Although API 140 is shown as being included within system memory 104, software application 130 may copy API 140 to memory associated with one or more PPUs resident within parallel processing subsystem 112 in order to provide software application 130 with access to the extensions within API 140 when executing on those PPUs. Software application 130 and API 140 are described in greater detail below in conjunction with FIGS. 4-10.

Figure 2:
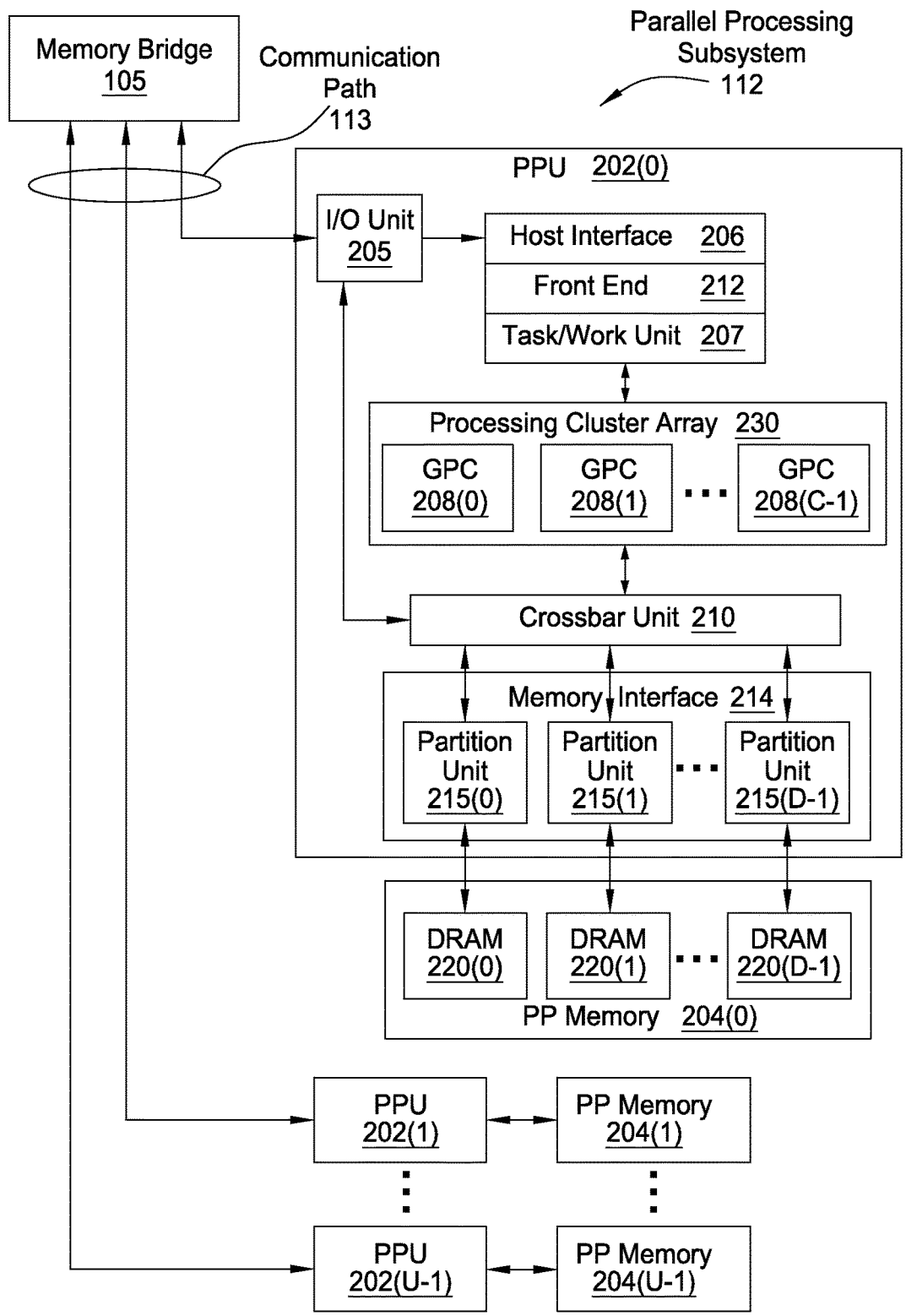
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
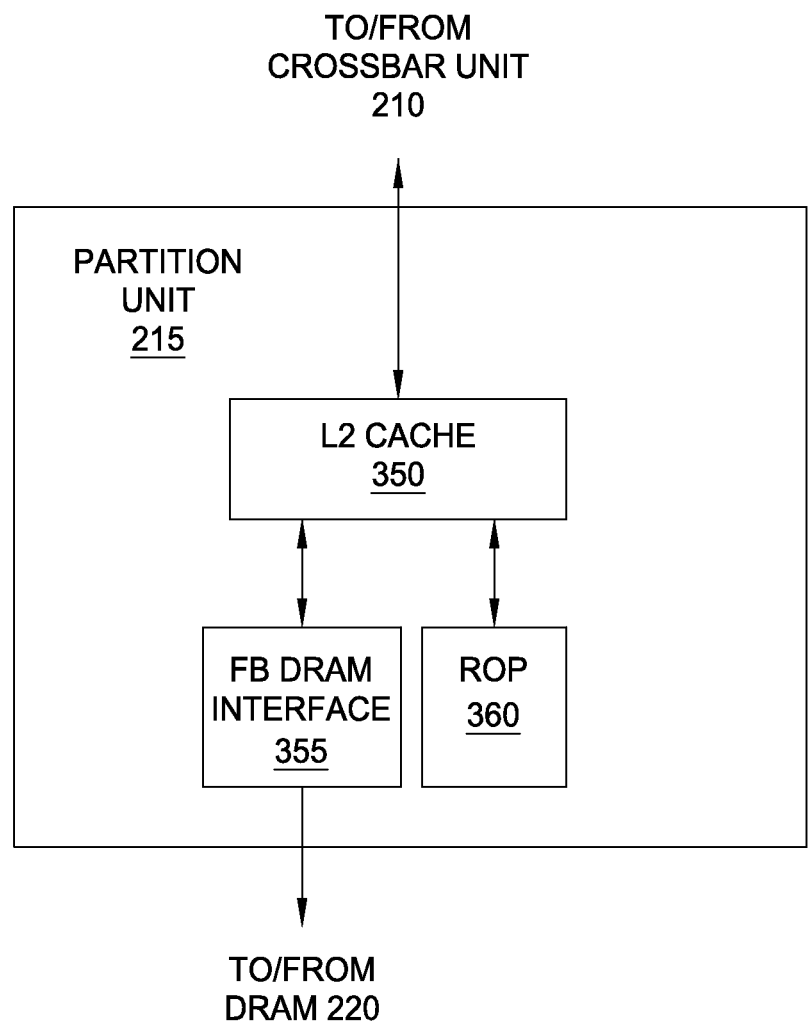
FIG. 3A is a block diagram of a partition unit within one of the PPUs of FIG. 2, according to one embodiment of the invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
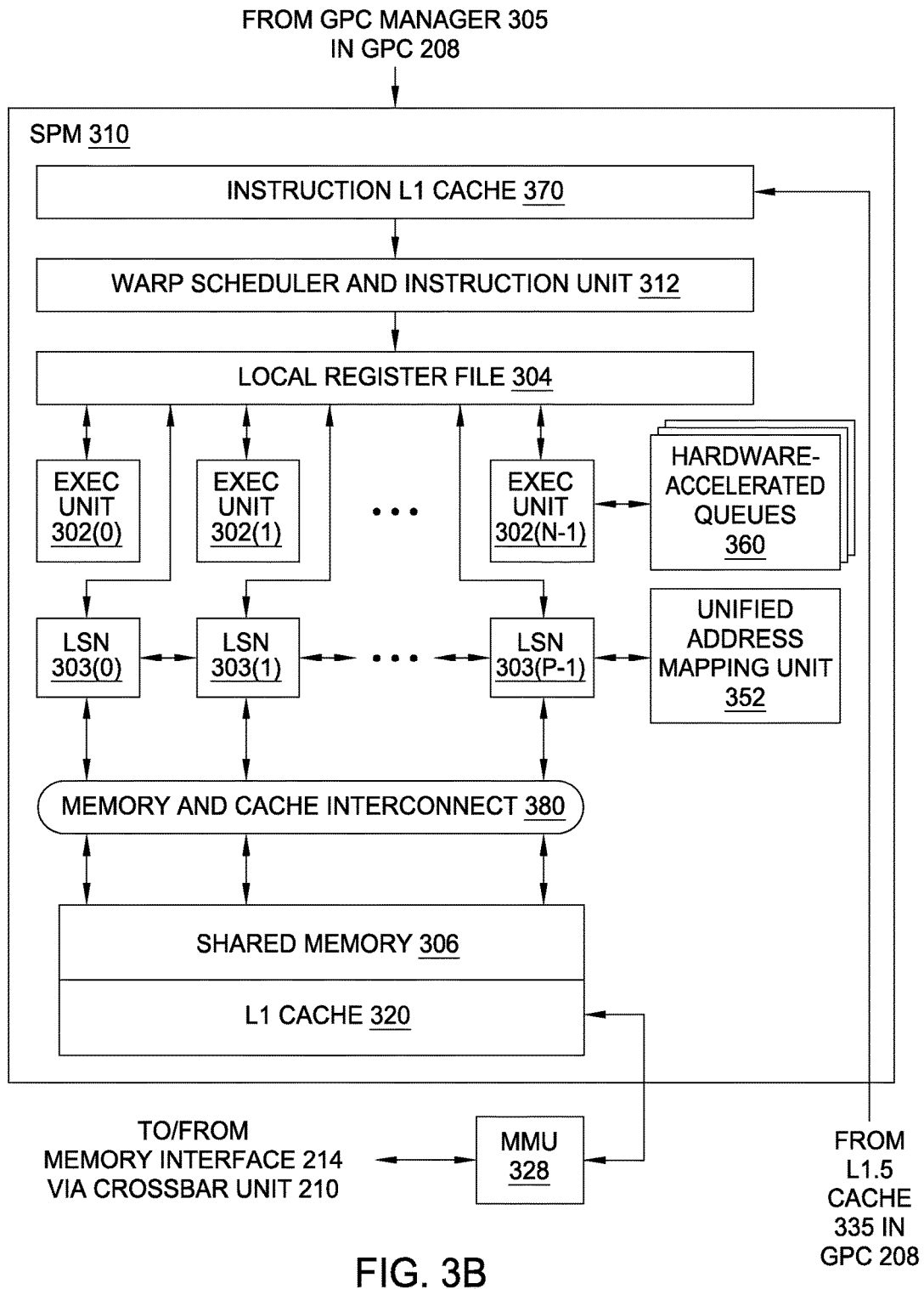
FIG. 3B is a block diagram of a portion of a streaming multiprocessor (SM) within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown)

within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Application Programming Interface to Enable the Construction of Pipeline Parallel Programs As mentioned above in conjunction with FIG. 1, API 140 is a software application that includes a library of extensions that may be executed by PPUs 202 within parallel processing subsystem 112. Those extensions provide a variety of different software constructs that the developer of software application 130 may assemble to generate processing pipelines, including processing pipelines capable of exhibiting braided parallelism. When executed by CPU 102, software application 130 may configure PPUs 202 to implement the software constructs associated with a particular processing pipeline. Then, PPUs 202 may execute program code associated with those software constructs via the extensions included within API 140. An exemplary processing pipeline that may be generated via software application 130 and executed via API 140 is discussed in greater detail below in conjunction with FIG. 4.

Figure 4:
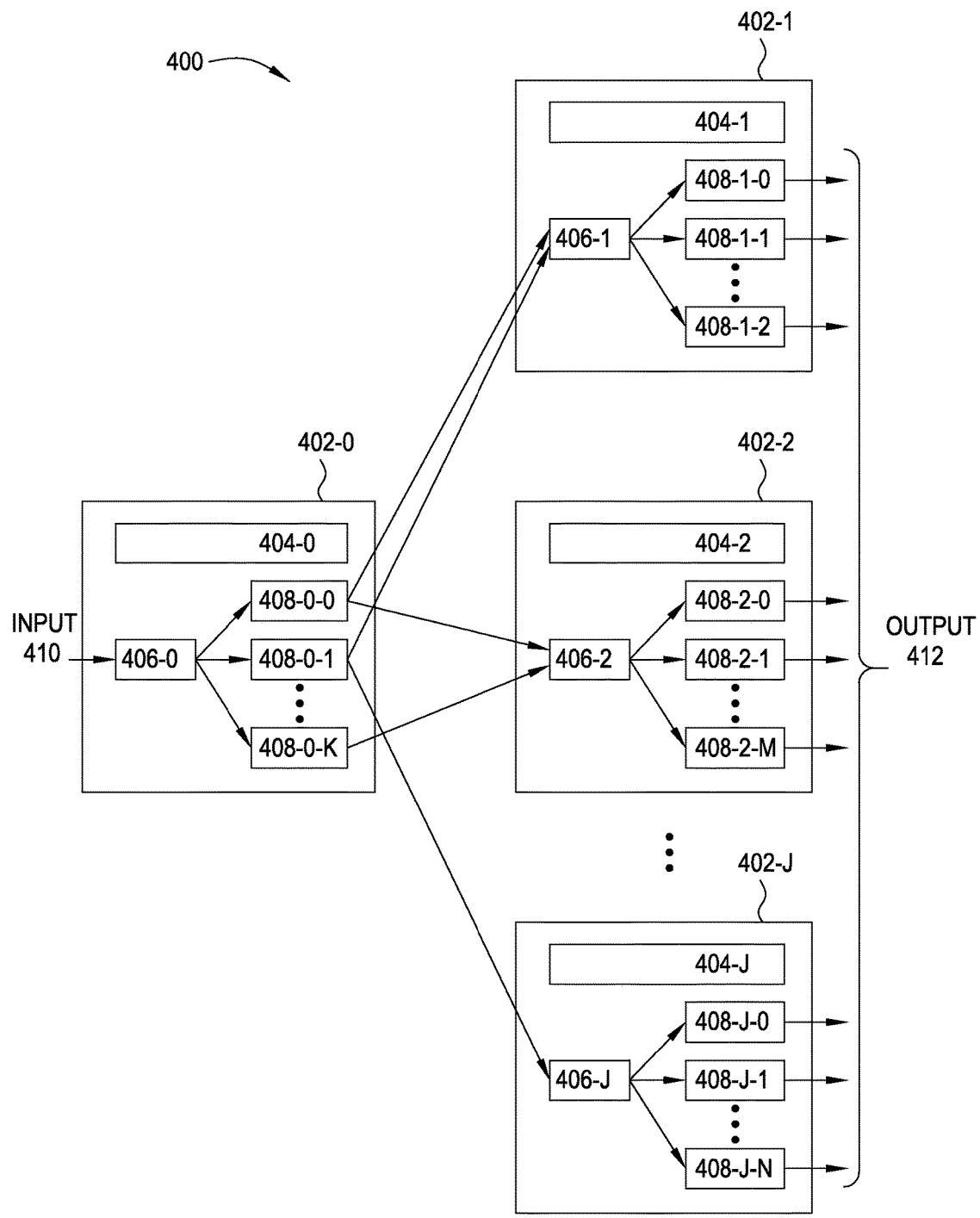
FIG. 4 is a conceptual diagram of a processing pipeline that may be implemented by the computer system of FIG. 1, according to one embodiment of the present invention.

FIG. 4 is a conceptual diagram of a processing pipeline 400 that may be implemented by the computer system of FIG. 1, according to one embodiment of the present invention. The various elements within processing pipeline 400 represent the software constructs provided by API 140. As shown, processing pipeline 400 includes a set of pipestages 402 coupled together to form processing pipeline 400. Processing pipeline 400 may represent a complete processing pipeline, or may also represent a portion of a larger processing pipeline that is not entirely shown in FIG. 4. Pipestage 402-0 is coupled to pipestages 402-1 and 402-1 through 402-J that reside downstream of pipestage 402-0, J being a positive integer value.

Each pipestage 402 is associated with one or more CTAs, where each such CTA may have a specific configuration, perform specific processing operations, and rely on specific input data. In addition, different pipestages 402 may be associated with different CTAs that may have different configurations, perform different processing operations, and rely on different input data. Those different CTAs may execute in parallel with one another, serially, or a combination of the two, in order to perform those different processing operations. In general, each different pipestage 402 may be associated with one or more CTAs that execute in parallel or serially with one or more other CTAs associated with one or more other pipestages 402. The CTAs associated with each pipestage are described in greater detail below in conjunction with FIGS. 5-6.

A pipestage 402 may consume output data that is produced by one or more upstream pipestages 402, and may also generate output data that is consumed by one or more downstream pipestages 402. For example, a CTA associated with pipestage 402-0 could execute a processing operation to consume input 410 and then generate data that is consumed by pipestage 402-1. A CTA associated with pipestage 402-1 could then perform another processing operation to generate a portion of output 412 that could be consumed by a downstream pipestage 402 (not shown).

With the configuration described above, CTAs associated with pipestage 402-0, pipestage 402-1, and the downstream pipestage 402 may depend on one another and may execute serially. In addition, pipestage 402-0 may also be associated with one or more other CTAs that execute in parallel with one or more other CTAs associated with pipestage 402-1 and/or the downstream pipestage 402. As a general matter, some CTAs associated with a given pipestage 402 may execute serially with some CTAs associated with another pipestage 402, while other CTAs associated with the given pipestage 402 may execute in parallel with other CTAs associated with the other pipestage 402.

A pipestage 402 may also be configured to generate additional pipestages 402 that reside downstream of that pipestage 402. For example, a CTA associated with pipestage 402-0 could execute an operation that generates, configures, and launches additional CTAs associated with pipestage 402-1. With this approach, pipestage 402-0 may spawn any number of downstream pipestages 402, as needed, to perform a variety of different processing operations. In one embodiment, the maximum number of pipestages 402 that may be spawned by a given pipestage 402 is configurable and may be defined by the developer of software application 130 or determined dynamically by execution of a pipestage 402.

Pipestages 402 included in processing pipeline 400 may be configured to perform a wide variety of different tasks, including general compute tasks as well as graphics processing tasks. For example, pipestage 402-0 could implement a coarse raster functionality and process batches of graphics primitives to generate pixels. Pipestage 402-1 could consume those pixels and implement a fine raster functionality. Various CTAs associated with pipestage 402-1 could execute different pixel shader programs to process those pixels, or, alternatively, spawn additional pipestages 402 that could implement those pixel shader programs. The developer of software application 130 may specify the coarse raster functionality, the fine raster functionality, and the different pixel shader programs described in this example, as well as the conditions under which a given pipestage 402 spawns another pipestage 402. With this approach, the developer of software application 130 is provided with fine-grained control over the structure of processing pipeline 400, as well as the functionality of each pipestage associated processing pipeline 400.

Persons skilled in the art will recognize that the functionality of pipestages 402 described herein may be implemented according to a wide variety of different approaches. However, in the exemplary embodiment described herein, a generic pipestage 402 includes a controller 404, a storage queue 406, and one or more task streams 408 that may be configured to implement the functionality of the generic pipestage 402, as described herein.

In FIG. 4, pipestage 402-0 includes controller 404-0, storage queue 406-0, and task streams 408-0-0 through 408-0-K. Pipestage 402-1 includes controller 404-1, storage queue 406-1, and task streams 408-1-0 through 408-1-L, pipestage 402-2 includes controller 404-2, storage queue 406-2, and task streams 408-2-0 through 408-2-M, and pipestage 402-J includes controller 404-J, storage queue 406-J, and task streams 408-J-0 through 408-J-N. In the exemplary embodiment described herein, K, L, M, and N may each represent any positive integer value.

In a generic pipestage 402, controller 404 is configured to manage the overall functionality of that pipestage 402. Controller 404 could be a hardware element associated with a PPU 202 or a CTA executing on an SM 310 within a PPU 202. Storage queue 406 may be a hardware-accelerated, circular bounded queue that implements a first-in, first-out (FIFO) policy. In one embodiment, a given storage queue 406 may be one of hardware accelerated queues 360 shown in FIG. 3B. A task stream 408 includes a set of tasks, where each task includes different phases of execution. Task stream 408 is described in greater detail below in conjunction with FIG. 5. Each phase of execution within a task associated with a task stream 408 may be implemented by a CTA configured to execute on an SM 310, as described in greater detail below in conjunction with FIG. 6. Each such CTA may have a specific configuration, perform specific processing operations, and rely on specific input data. Consequently, each different task stream 408 may be associated with one or more different CTAs.

A CTA associated with a task stream 408 included within a pipestage 402 may be configured to generate output data and to write that output data to a storage queue 406 included within another pipestage 402. Additionally, multiple different CTAs associated with the task stream 408 may be configured to generate output data and to write that output data to multiple different storage queues 406 included within other pipestages 406. Since a pipestage 402 may include any number of different task streams 408, any given pipestage 402 may be configured to generate and write data to any number of different storage queues 406 associated with a corresponding number of pipestages 402. When a storage queue 406 within a pipestage 402 is populated with data, the controller 404 within the pipestage 402 may pop data from the storage queue 406 on behalf of CTAs included within the task streams 408 within that pipestage 402. Those CTAs may then process that data. In one embodiment, the CTAs associated with a given pipestage 402 may pass data between one another via the storage queue 406 also associated with that pipestage 402. In doing so, the controller 404 within the given pipestage 402 may push data onto the storage queue 406 on behalf of those CTAs for access by other CTAs.

In FIG. 4, data is written to storage queue 406-0 within pipestage 402-0 from an upstream pipestage 402 or from software application 130 (e.g., in situations where pipestage 402 is the first pipestage in processing pipeline 400). CTAs within task stream 408-0-0 may then process a portion of that data and write output data to storage queue 406-1 within pipestage 402-1 and storage queue 406-2 within pipestage 402-2. CTAs within task stream 408-0-1 may simultaneously process another portion of that data and write output data to storage queue 406-1 within pipestage 402-1 and storage queue 406-J within pipestage 402-J. CTAs within task stream 408-0-K may simultaneously process yet another portion of that data and write output data to storage queue 406-2 within pipestage 402-2. CTAs within task streams 408 within pipestages 402 downstream of pipestage 402-0 may then retrieve input data from storage queues 406, process that data, and write output data to memory or to storage queues 406 within pipestages 402 residing further downstream. Although processing pipeline 400 is illustrated to represent a left-to-right flow of data, processing pipeline 400 may also be configured with any number of loops and recirculation connections. For example, the output 412 of pipestages 402-1, 402-2, and 402-J could recirculate to become input 410 and be stored within storage queue 406-0 for additional processing by pipestage 402-0, thereby implementing a recirculating processing pipeline.

In general, the developer of software application 130 may facilitate the flow of data through pipestages 402 within processing pipeline 400 in any conceivable fashion by specifying the overall structure of processing pipeline 400 within software application 130. In doing so, the developer may specify conditions when a given pipestage 402 spawns additional pipestages and a number of pipestages to be spawned. Accordingly, the precise configuration of processing pipeline 400 may change over time in a fashion that is determined by the developer.

The developer of software application 130 may also specify the operation of a given pipestage 402 by configuring one or more task streams 408 included within that pipestage 402 to implement the overall processing functionality of the pipestage 402. A generic task stream 408, and the configuration of that task stream 408, is described in greater detail below in conjunction with FIG. 5.

Figure 5:
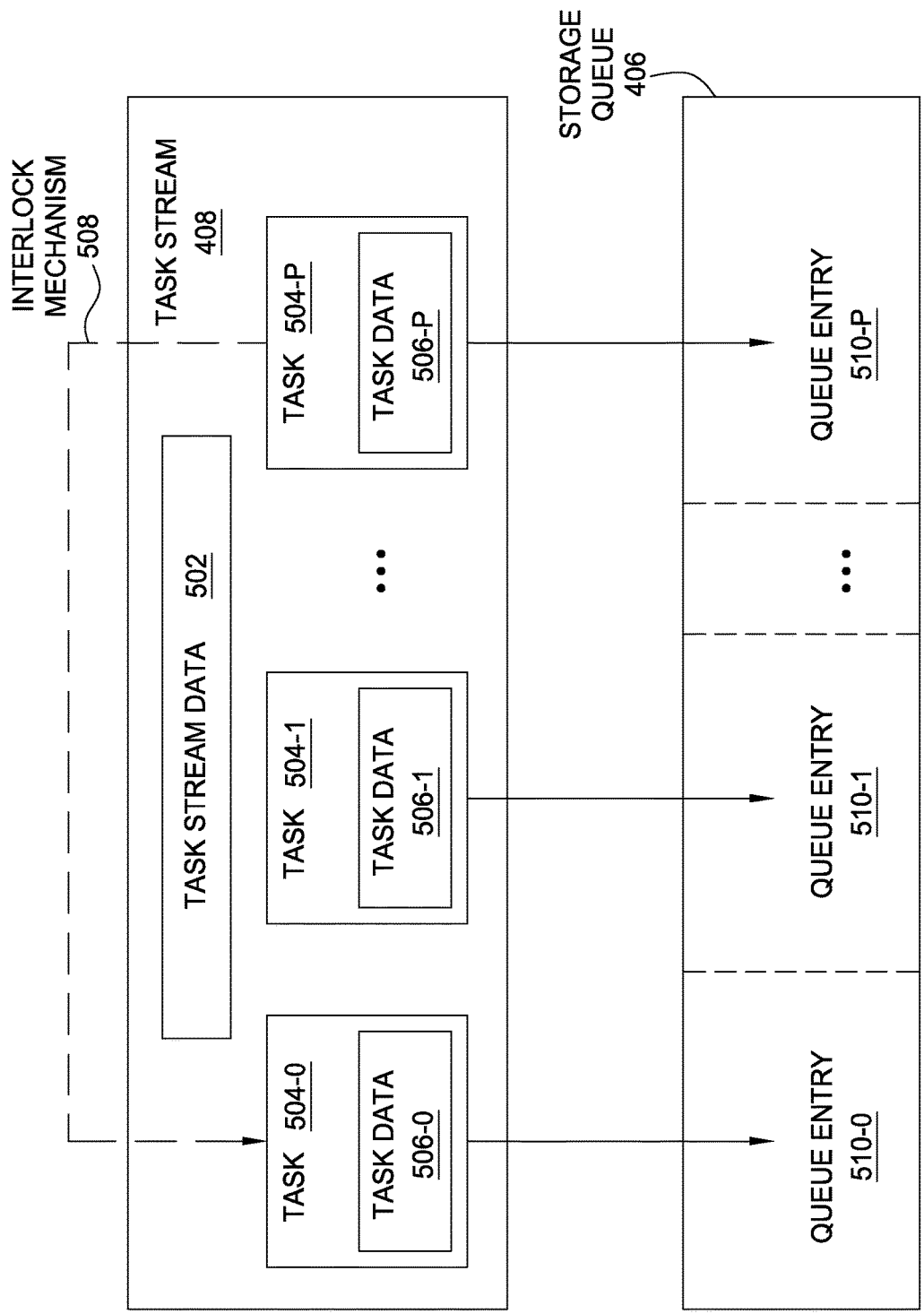
FIG. 5 illustrates a task stream included within a pipestage in the processing pipeline of FIG. 4, according to one embodiment of the present invention.

FIG. 5 illustrates a task stream 408 included within a pipestage 402 in the processing pipeline 400 of FIG. 4, according to one embodiment of the present invention. As shown, task stream 408 includes task stream data 502, as well as tasks 504-0 and 504-1 through 504-P, P being a positive integer. Each task 504 includes task data 506. Task 504-0 includes task data 506-0, task 504-1 includes task data 506-1, and task 504-P includes task data 506-P.

A given task 504 is associated with one or more CTAs that are configured to execute a set of functions on data retrieved from a storage queue 406 that is included within the pipestage 402 that includes task stream 408. In doing so, the different CTAs associated with the given task 504 may generate output data and write that output data to a queue entry 510 within storage queue 406 that is shared between those different CTAs. In FIG. 5, storage queue 406 is included within a pipestage 402 that resides downstream of the pipestage 402 that includes task stream 408.

Each task 504 within task stream 408 may be configured based on task stream data 502. Task stream data 502 includes functions that may be executed by the CTAs within tasks 504, data indicating specific storage queues 406 to which each task 504 should write output data, as well as flags common to each task 504 within task stream 408. In general, task stream data 502 includes any data that may be needed to configure a given task 504 within task stream 408. Task stream data 502 may also include additional information for configuring hardware that implements task stream 408.

When a given task 504 is launched, i.e. when at least one CTA within the given task 504 is executed, the given task 504 is provided with task data 506 that may include a specific subset of task stream data 502 that is needed by the CTAs associated with the given task 504. Accordingly, task data 506 associated with the given task 504 may include the specific functions to be executed by the CTAs associated with the given task 504, one or more specific storage queues 406 to which those CTAs should write output data, and any flags that are specific to those CTAs.

Task data 506 may also include configuration parameters for each CTA associated with the given task 504, including a width, a number of threads, an amount of shared memory, and other such parameters related to the configuration of a CTA. A given configuration parameter for a CTA may also be omitted from task data 506, in which case the CTA may be configured according to a default value for the omitted configuration parameter.

When a task 504 is created (e.g. by issuing a command provided by API 140), the task 504 is allocated a specific queue entry 510 to which output data should be written, as mentioned above. As shown, task 504-0 is allocated queue entry 510-0, task 504-1 is allocated queue entry 510-1, and task 504-P is allocated queue entry 510-P. The different tasks 504 included within task stream 408 may be created in order, and the specific queue entries allocated to those tasks 504 are allocated according to that same order, as is shown.

When a given task 504 is complete, i.e. when all of the CTAs associated with the given task 504 have completed, the output data generated by those CTAs may be committed to the queue entry 510 allocated to that task 504. The different tasks 504 may complete in the order of creation or those tasks 504 may complete in an arbitrary order. However, since the queue entries 510 for each such task 504 are allocated in order within storage queue 406, the original order of creation of those tasks 504 is preserved across the output data generated by those tasks 504. With this approach, storage queue 406 may act as a reorder buffer for data generated by tasks 504 that complete out of order.

Various tasks 504 may also be caused to complete according to a particular order that may be specified by the developer of software application 130. An interlock mechanism provided by API 140 may be implemented to specify that order. The interlock mechanism indicates a dependency between different tasks 504 and requires a given task 504 to complete before another task 504 begins. For example, as shown in FIG. 5, interlock mechanism 508 could specify a dependency between tasks 504-P and 504-0. Interlock mechanism 508 would require task 504-0 to complete before task 504-P begins. The general functionality of interlock mechanism 508 described herein may thus be implemented to cause different tasks 504 to serialize according to a sequence specified by the developer of software application 130.

Referring to the example shown in FIG. 4, in one embodiment, interlock mechanism 508 may be implemented by providing an interlock tag to task 504-0. When task 504-P is launched, task 504-P is provided with a value associated with that interlock tag. If task 504-0 has not released the interlock tag, then task 504-P may not start. Once task 504-0 completes, the interlock tag is released, and task 504-P may begin. In a further embodiment, multiple different 64-bit interlock tags may be stored in memory associated with a PPU 202 that executes processing pipeline 400, and those different interlock tags may be re-used between different tasks 504 within that processing pipeline.

The CTAs associated with a given task 504 may be organized according to different phases of execution, where each phase is associated with a different CTA. A generic task 504, and the configuration of that task 504, is described in greater detail below in conjunction with FIG. 6.

Figure 6:
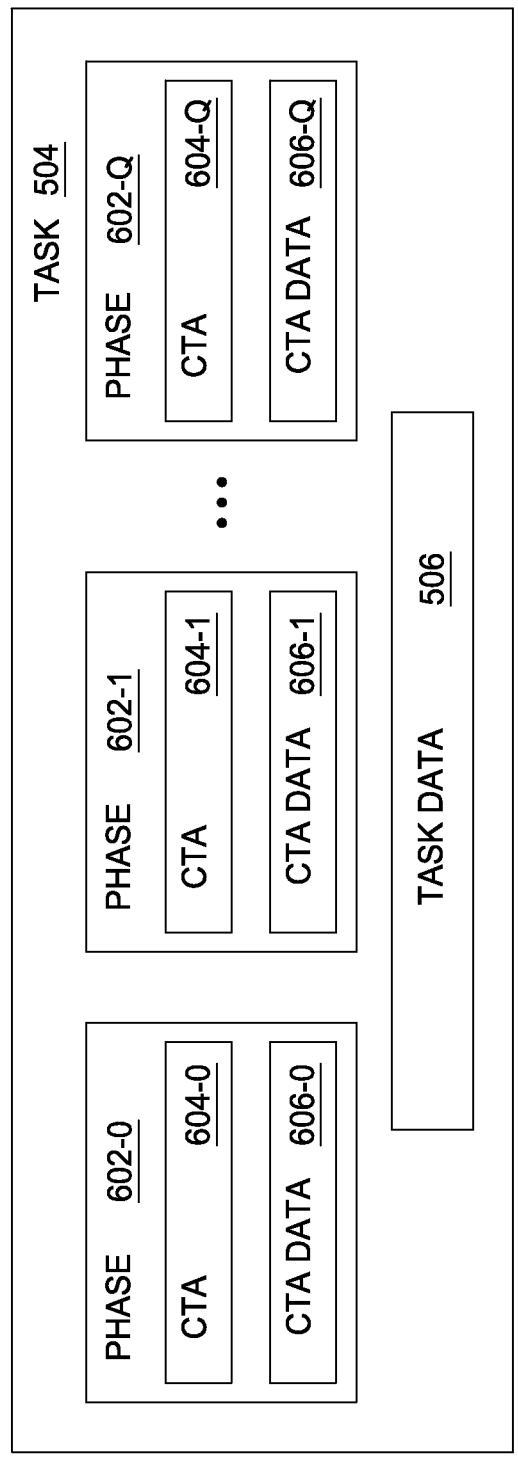
FIG. 6 illustrates a task included within the task stream of FIG. 5, according to one embodiment of the present invention.

FIG. 6 illustrates a task 504 included within the task stream 408 of FIG. 5, according to one embodiment of the present invention. As shown, task 504 includes phases 602-0 and 602-1 through 602-Q as well as task data 506. Task data 506 includes data needed to configure task 504 and is described above in conjunction with FIG. 5.

Each phase 602 includes a CTA 604 and CTA data 606. Phase 602-0 includes CTA 604-0 and CTA data 606-0, phase 602-1 includes CTA 604-1 and CTA data 606-1, and phase 602-Q includes CTA 604-Q and CTA data 606-Q. CTA data 606 generally includes data needed to configure a corresponding CTA, including a width, a number of threads, and an amount of shared memory. CTA data 606 also includes a set of functions derived from task data 506 to be specifically executed by the corresponding CTA. For example, CTA data 606-0 may include the specific functions to be executed by CTA 604-0, where those functions are derived from a set of functions included in task data 506.

Since each phase 602 is associated with a different CTA 604 configured according to different CTA data 606, each such phase 602 may cause substantially different processing operations to be executed by a different number of threads organized according to different dimensions and having different amounts of shared memory. When given phase 602 is complete, i.e. when CTA 604 within that phase 602 exits, a subsequent phase 602 may begin or task 504 as a whole may complete. As previously mentioned, when task 504 completes, all output data generated by the CTAs 604 within that task 504 is committed to a storage queue entry 510 allocated for that task 504.

The aforementioned techniques for constructing processing pipeline 400 via API 140 provide significantly greater flexibility to the developer of software application 130 than previously possible with conventional APIs. In particular, the developer of software application 130 is capable of specifying the precise configuration, functionality, and ordering of each different CTA associated with processing pipeline 400 as a whole. With that capability, the developer may implement processing pipeline 400 to have arbitrary structure and complexity, including structures that support braided parallelism. Various techniques for configuring and executing portions of processing pipeline 400 are discussed in greater detail below in conjunction with FIGS. 7-10. Those techniques may be implemented when software application 130 is executed and causes PPU 202 to execute various different portions of API 140.

Figure 7:
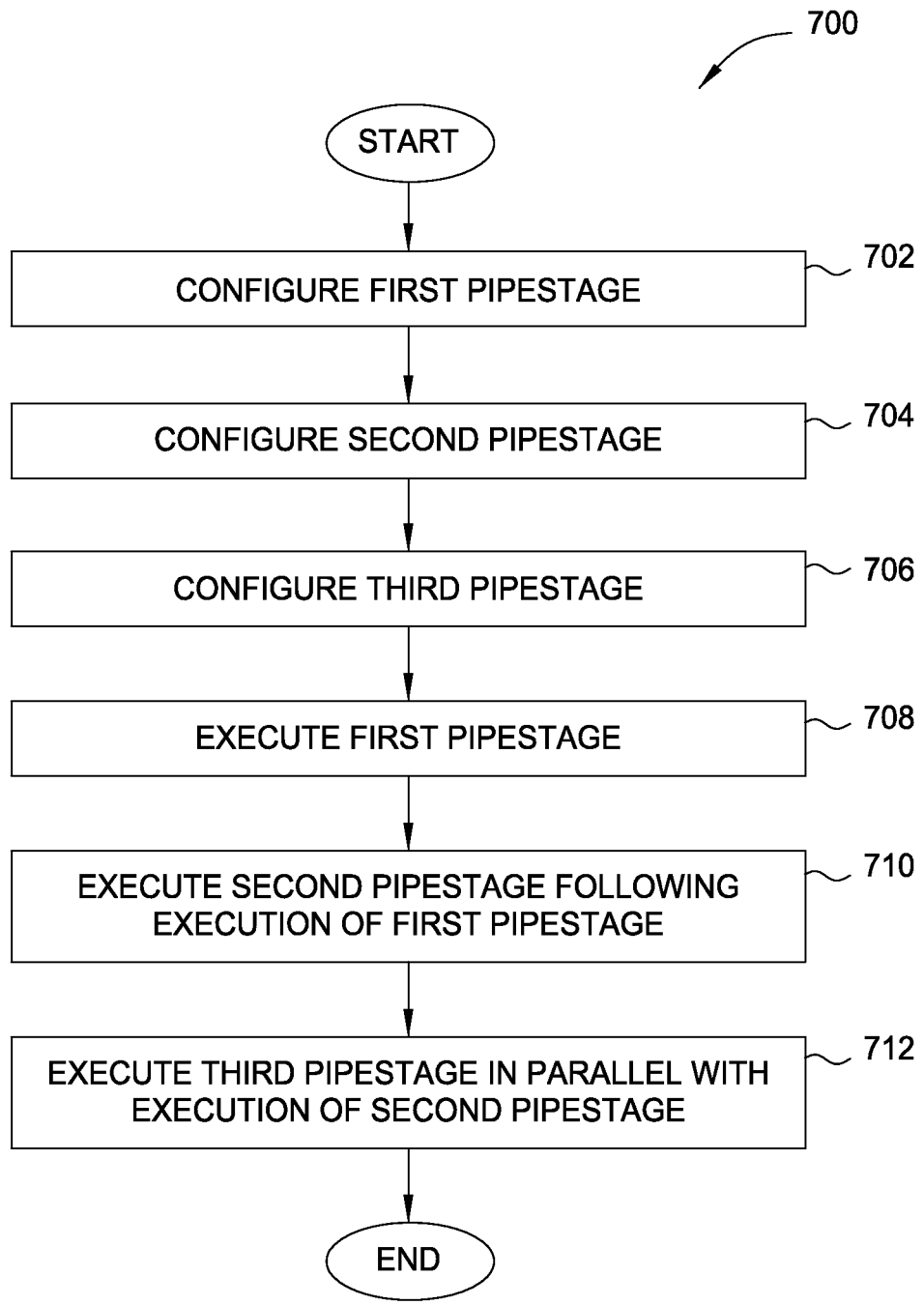
FIG. 7 is a flow diagram of method steps for configuring and executing a portion of the processing pipeline of FIG. 4, according to one embodiment of the present invention.

FIG. 7 is a flow diagram of method steps for configuring and executing a portion of the processing pipeline 400 of FIG. 4, according to one embodiment of the present invention. Although the method steps are described in conjunction with the systems of FIGS. 1-6, persons skilled in the art will understand that any system configured to perform the method steps, in any order, is within the scope of the present invention.

As shown, a method 700 begins at step 702, where software application 130 causes API 140 to configure pipestage 402-0 shown in FIG. 4. In performing step 702, software application 130 may execute calls to API 140 that would then be executed by PPU 202. In response to software application 130, API 140 may also configure task streams 408-0-0, 408-0-1, and 408-0-K associated with pipestage 402-0 and allocate task stream data 502, as needed, for each such task stream 408.

At step 704, similar to step 702, software application 130 causes API 140 to configure pipestage 402-1 shown in FIG. 4. In response to software application 130, API 140 may also configure task streams 408-1-0, 408-1-1, and 408-1-L associated with pipestage 402-1 and allocate task stream data 502, as needed, for each such task stream 408.

At step 706, similar to steps 702 and 704, software application 130 causes API 140 to configure pipestage 402-2 shown in FIG. 4. In response to software application 130, API 140 may also configure task streams 408-2-0, 408-2-1, and 408-2-M associated with pipestage 402-2 and allocate task stream data 502, as needed, for each such task stream 408.

At step 708, API 140 causes pipestage 402-0 to execute, i.e. API 140 launches one or more CTAs associated with task streams 408 within pipestage 402-0.

At step 710, API 140 causes pipestage 402-1 to execute following execution of pipestage 402-0, i.e. API 140 launches one or more CTAs associated with task streams 408 within pipestage 402-1 once pipestage 402-0 has completed.

At step 712, API 140 causes pipestage 402-2 to execute in parallel with pipestage 402-1, i.e. API 140 launches one or more CTAs associated with task streams 408 within pipestage 402-2 for parallel execution with the one or more CTAs associated with task streams 408 within pipestage 402-1 launched at step 710.

In one embodiment, steps 704 and 706 occur subsequent to step 708 in response to step 708 being performed. In particular, when API 140 performs step 708, pipestage 402-0 may configure pipestages 402-1 and 402-2 and subsequently cause those pipestages to be executed. In this embodiment, a given CTA within pipestage 402-0 may be capable of spawning and configuring additional CTAs and/or additional pipestages, such as pipestages 402-1 and 402-2, without specific reliance on software application 130.

A generic pipestage 402 may be configured in the fashion described above in conjunction with either of steps 702, 704, and 706, by implementing the technique described below in conjunction with FIG. 8.

Figure 8:
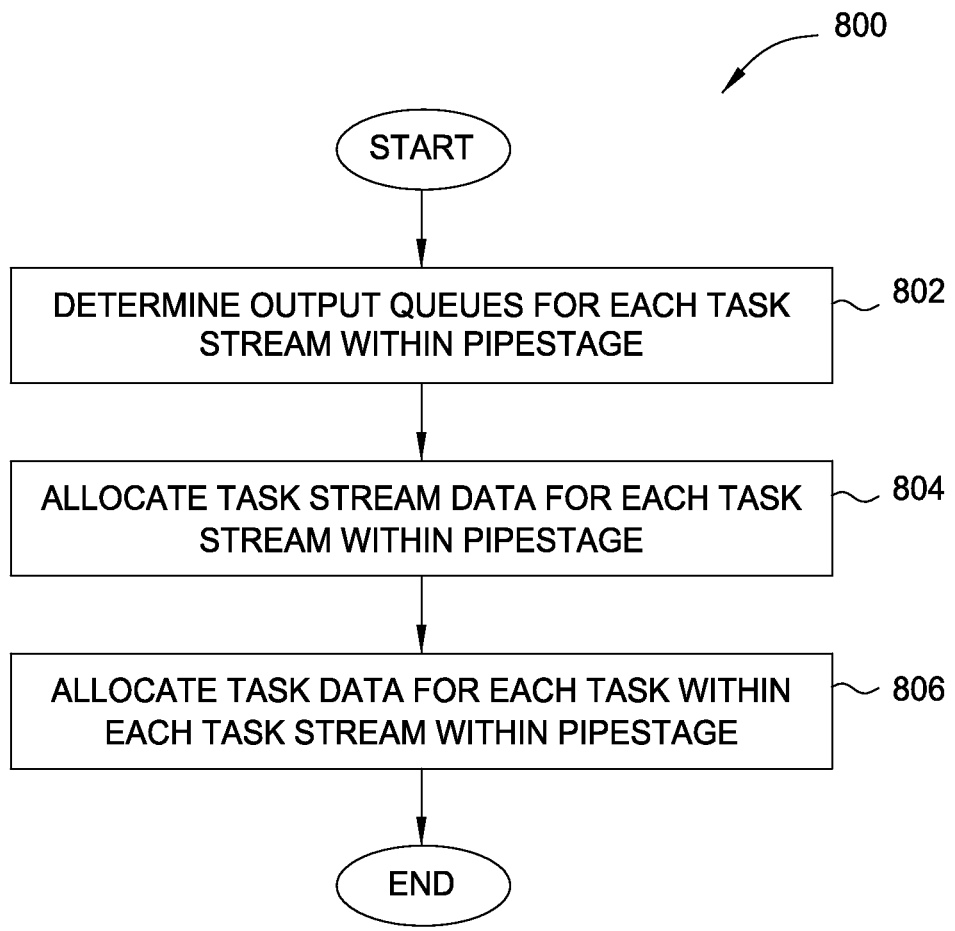
FIG. 8 is a flow diagram of method steps for configuring a pipestage in the processing pipeline of FIG. 4, according to one embodiment of the present invention.

FIG. 8 is a flow diagram of method steps for configuring a pipestage 402 in the processing pipeline 400 of FIG. 4, according to one embodiment of the present invention. Although the method steps are described in conjunction with the systems of FIGS. 1-6, persons skilled in the art will understand that any system configured to perform the method steps, in any order, is within the scope of the present invention.

As shown, a method 800 begins at step 802, where software application 130 determines an output queue 406 for each task stream 408 within a pipestage 402. Each such output queue 406 may be included within another pipestage 402 residing downstream of the pipestage 402 discussed herein. In one embodiment, a given output queue 406 comprises a hardware-accelerated circular buffer.

At step 802, software application 130 may also allocate a queue entry 510 for each task 504 within task stream 408, where the different CTAs associated with each such task 504 are configured to share the corresponding queue entry 510. In one embodiment, the allocation of queue entries 510 occurs during runtime (and not during the configuration of pipestage 402) and so software application 130 may skip step 804. In this embodiment, during runtime a pipestage controller 404 included in the pipestage 402 is configured to allocate entries in downstream storage queues 406 after popping entries from the storage queue 406 included in the pipestage 402 for processing by the task streams 408 within that pipestage 402. Once data associated with the popped entries has been processed by CTAs within those task streams 408, the controller 404 may then push the processed data onto the downstream storage queues 406.

At step 804, software application 130 allocates task stream data 502 for each task stream 408 within the pipestage 402. Task stream data 502 includes functions that may be executed by the CTAs within tasks 504, data indicating specific storage queues 406 to which each task 504 should write output data, as well as flags common to each task 504 within task stream 408. In general, task stream data 502 includes any data that may be needed to configure a given task 504 within task stream 408. Task stream data 502 may also include additional information for configuring hardware that implements task stream 408.

At step 806, software application 130 allocates task data 506 for each task 504 within each task stream 408. Task data 506 may include a specific subset of task stream data 502 allocated at step 804 that is needed by the CTAs associated with each different task 504. Accordingly, task data 506 associated with a given task 504 may include the specific functions to be executed by the CTAs associated with the given task 504, one or more specific storage queues 406 to which those CTAs should write output data, and any flags that are specific to those CTAs. Task data 506 associated with a given task 504 may also include configuration parameters for each CTA associated with the given task 504, such as a width, a number of threads, an amount of shared memory, and other such parameters related to the configuration of a CTA.

Once pipestage 402 is configured by implementing the method 800, that pipestage may be executed, i.e. the task streams 408 associated with that pipestage may be launched and the CTAs associated with those task streams may be executed, as described in greater detail below in conjunction with FIG. 9.

Figure 9:
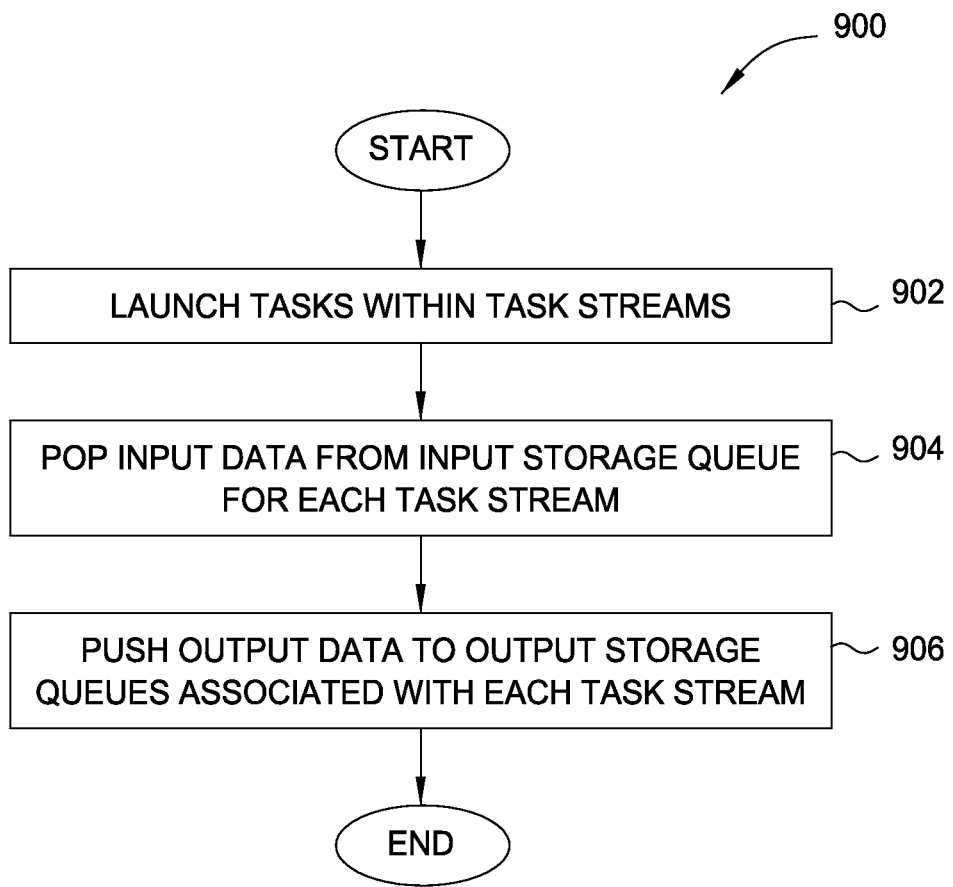
FIG. 9 is a flow diagram of method steps for executing a pipestage in the processing pipeline of FIG. 4, according to one embodiment of the present invention.

FIG. 9 is a flow diagram of method steps for executing a pipestage 402 in the processing pipeline 400 of FIG. 4, according to one embodiment of the present invention. Although the method steps are described in conjunction with the systems of FIGS. 1-6, persons skilled in the art will understand that any system configured to perform the method steps, in any order, is within the scope of the present invention.

As shown, a method 900 begins at step 902, where a controller 404 within the pipestage 402 launches one or more different tasks included within one or more task streams 408 associated with the pipestage 402. In doing so, the controller 404 within the pipestage 402 may launch a CTA 604 corresponding to a first phase 602 of each task 504 associated with each such task stream 408. Those tasks 504 may execute simultaneously or may be caused to serialize according to an interlock mechanism implemented by API 140, as discussed in greater detail below in conjunction with FIG. 10.

At step 904, the controller 404 within the pipestage 402 pops input data from an input storage queue 406 associated with the pipestage 402. The CTAs associated with each different task stream 408 may then execute various functions included within corresponding CTA data 606 and derived from task stream data 502 to generate output data.

At step 906, the controller 404 within the pipestage 402 pushes data associated with any completed tasks 504 to output storage queues 406 associated with those completed tasks 504. The controller 404 may implement either or both of steps 904 and 906 iteratively, as needed, in order to provide CTAs associated with task streams 408 with input data and to commit output data generated by those CTAs to output storage queues 406. As a general matter, the functionality of the controller 404 described herein is derived from API 140.

As mentioned above, tasks 504 within a given task stream 408 may be serialized by implementing an interlock mechanism described in greater detail below in conjunction with FIG. 10.

Figure 10:
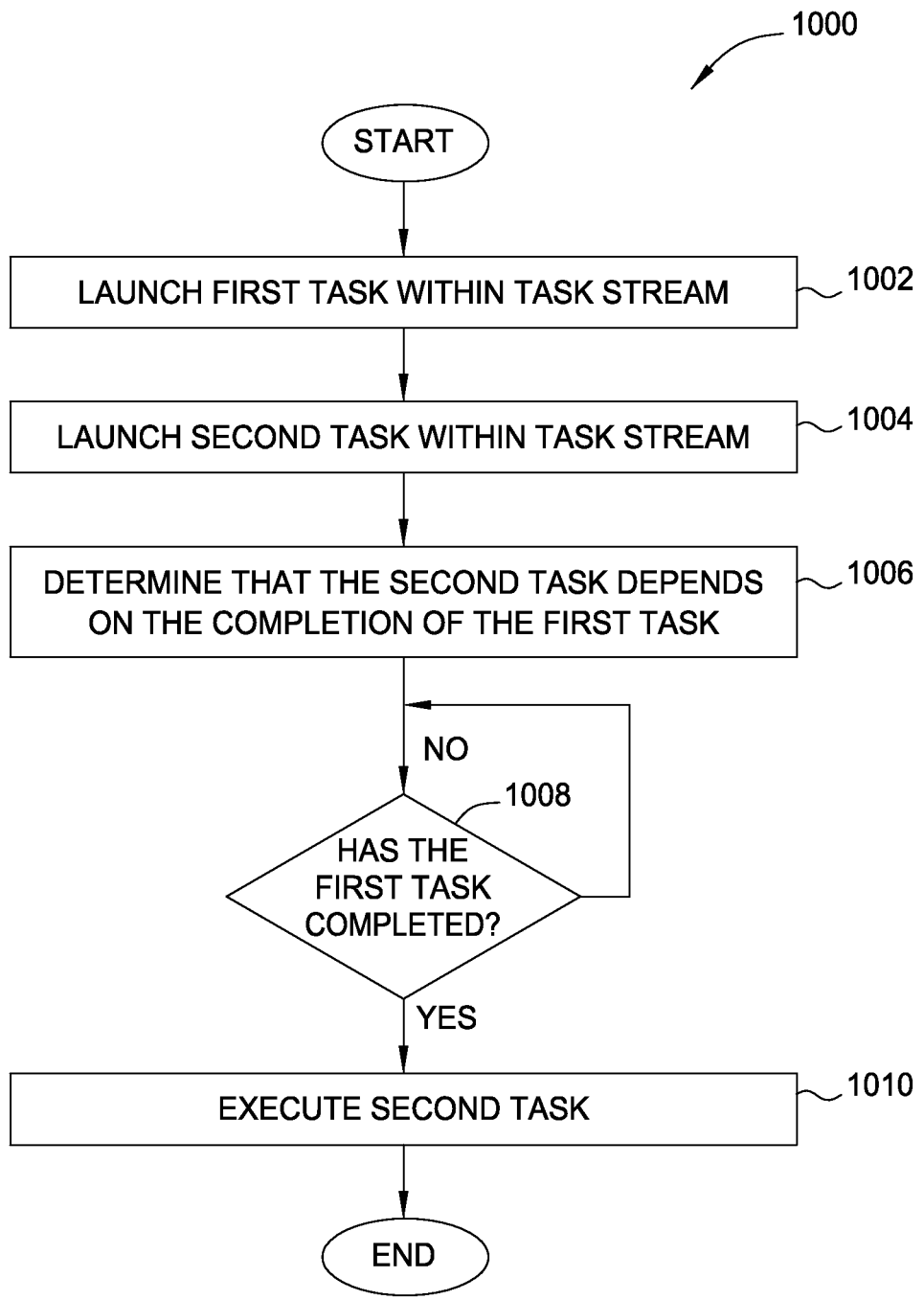
FIG. 10 is a flow diagram of method steps for serializing a first task and a second task included within the task stream of FIG. 5, according to one embodiment of the present invention.

FIG. 10 is a flow diagram of method steps for serializing a first task and a second task included within task stream 408 of FIG. 5, according to one embodiment of the present invention. Although the method steps are described in conjunction with the systems of FIGS. 1-6, persons skilled in the art will understand that any system configured to perform the method steps, in any order, is within the scope of the present invention.

As shown, a method 1000 begins at step 1002, where API 140 launches task 504-0 into task stream 408, as shown in FIG. 5. Task 504-0 may acquire an interlock tag having a specific value. At step 1004, API 140 launches task 504-P into task stream 408 and passes task 504-P the value of the interlock tag held by task 504-0.

At step 1006, API 140 determines that task 504-P depends on the completion of task 504-0. API 140 could, for example, determine that the value passed to task 504-P matches the value of the interlock tag held by task 504-0. At step 1008, API 140 causes task 504-P to stall until task 504-0 completes and releases the interlock tag. When task 504-0 is complete, the method proceeds to step 1010, where task 504-P is executed.

API 140 may implement the method 1000 in order to serialize tasks 504 according to a sequence specified by the developer of software application 130. With this approach, the developer is provided with a fine-grained synchronization mechanism for ordering the execution of different CTAs.

In sum, an application programming interface (API) provides various software constructs that allow a developer to assemble a processing pipeline having arbitrary structure and complexity. Once assembled, the processing pipeline is configured to include a set of interconnected pipestages. Those pipestages are associated with one or more different CTAs that may execute in parallel with one another on a parallel processing unit. The developer specifies the configuration of the pipestages, including the configuration of the different CTAs across all pipestages, as well as the different processing operations performed by each different CTA.

Advantageously, the developer is provided with a highly flexible framework within which processing pipelines of arbitrary structure and complexity may be generated for execution on the PPU.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for executing a processing pipeline within a parallel processing unit (PPU), the method comprising:
    causing the PPU to configure a first set of processing engines to execute a first pipestage of the processing pipeline that includes a first plurality of task streams; and
    causing the first set of processing engines to execute a first plurality of cooperative thread arrays (CTAs) in parallel to generate first output data, wherein a given task stream in the first plurality of task streams is related to a given set of CTAs in the first plurality of CTAs,
    wherein causing the PPU to configure the first set of processing engines comprises:
        causing the PPU to configure the first pipestage to include a controller that manages the operation of the first pipestage;
        causing the PPU to configure the first pipestage to include a first input storage queue that stores data to be processed by the first plurality of CTAs; and causing the PPU to allocate task stream data for the given task stream, wherein the task stream data includes a set of functions to be executed by the given set of CTAs.

2. The computer-implemented method of claim 1, further comprising:
causing the PPU to configure the given task stream to include one or more tasks, wherein a given task in the one or more tasks is related to a subset of CTAs in the given set of CTAs; and
causing the PPU to allocate task data for the given task in the one or more tasks, wherein the task data allocated for the given task is derived from the task stream data allocated for the given task stream and includes a subset of functions in the set of functions to be executed by the subset of CTAs in the given set of CTAs.

3. The computer-implemented method of claim 2, further comprising:
causing the PPU to configure the given task to include a sequence of phases,
wherein a given phase in the sequence of phases is executed by a CTA in the subset of CTAs, and
wherein the CTA is configured to execute one or more functions in the subset of functions to generate a portion of the first output data.

4. The computer-implemented method of claim 3, further comprising:
determining an output storage queue for the given task stream that is included within a second pipestage in the processing pipeline; and
allocating an entry in the output storage queue for the given task, wherein the subset of CTAs is configured to write portions of the first output data to the entry.

5. The computer-implemented method of claim 4, further comprising:
causing the PPU to configure a second set of processing engines to execute the second pipestage of the processing pipeline that includes a second plurality of task streams; and
causing the second set of processing engines to execute a second plurality of CTAs in parallel to generate second output data, wherein a given task stream in the second plurality of task streams is related to a given set of CTAs in the second plurality of CTAs.

6. The computer-implemented method of claim 5, wherein the second pipestage is configured to generate the second output data by processing the first output data, and wherein the first pipestage is configured to generate the first output data by processing output data previously generated by the second pipestage.

7. The computer-implemented method of claim 6, wherein the processing pipeline comprises a graphics processing pipeline, the first plurality of CTAs is configured to implement a first set of arbitrary graphics processing functions to generate the first output data, and the second plurality of CTAs is configured to implement a second set of arbitrary graphics processing functions to generate the second output data.

8. A non-transitory computer-readable medium storing program instructions that, when executed by a processing unit, cause the processing unit to execute a processing pipeline within a parallel processing unit (PPU), by performing the steps of:
causing the PPU to configure a first set of processing engines to execute a first pipestage of the processing pipeline that includes a first plurality of task streams; and
causing the first set of processing engines to execute a first plurality of cooperative thread arrays (CTAs) in parallel to generate first output data, wherein a given task stream in the first plurality of task streams is related to a given set of CTAs in the first plurality of CTAs,
wherein the step of causing the PPU to configure the first set of processing engines comprises:
causing the PPU to configure the first pipestage to include a controller that manages the operation of the first pipestage;
causing the PPU to configure the first pipestage to include a first input storage queue that stores data to be processed by the first plurality of CTAs; and
causing the PPU to allocate task stream data for the given task stream, wherein the task stream data includes a set of functions to be executed by the given set of CTAs.

9. The non-transitory computer-readable medium of claim 8, further comprising:
causing the PPU to configure the given task stream to include one or more tasks, wherein a given task in the one or more tasks is related to a subset of CTAs in the given set of CTAs; and
causing the PPU to allocate task data for the given task in the one or more tasks, wherein the task data allocated for the given task is derived from the task stream data allocated for the given task stream and includes a subset of functions in the set of functions to be executed by the subset of CTAs in the given set of CTAs.

10. The non-transitory computer-readable medium of claim 9, further comprising:
causing the PPU to configure the given task to include a sequence of phases,
wherein a given phase in the sequence of phases is executed by a CTA in the subset of CTAs, and
wherein the CTA is configured to execute one or more functions in the subset of functions to generate a portion of the first output data.

11. The non-transitory computer-readable medium of claim 10, further comprising:
determining an output storage queue for the given task stream that is included within a second pipestage in the processing pipeline; and
allocating an entry in the output storage queue for the given task, wherein the subset of CTAs is configured to write portions of the first output data to the entry.

12. The non-transitory computer-readable medium of claim 11, further comprising:
causing the PPU to configure a second set of processing engines to execute the second pipestage of the processing pipeline that includes a second plurality of task streams; and
causing the second set of processing engines to execute a second plurality of CTAs in parallel to generate second output data, wherein a given task stream in the second plurality of task streams is related to a given set of CTAs in the second plurality of CTAs.

13. The non-transitory computer-readable medium of claim 12, wherein the second pipestage is configured to generate the second output data by processing the first output data, and wherein the first pipestage is configured to generate the first output data by processing output data previously generated by the second pipestage.

14. The non-transitory computer-readable medium of claim 13, wherein the processing pipeline comprises a graphics processing pipeline, the first plurality of CTAs is configured to implement a first set of arbitrary graphics processing functions to generate the first output data, and the second plurality of CTAs is configured to implement a second set of arbitrary graphics processing functions to generate the second output data.

15. A system for executing a processing pipeline within a parallel processing unit (PPU), including:
a processing unit configured to:
cause the PPU to configure a first set of processing engines to execute a first pipestage of the processing pipeline that includes a first plurality of task streams, and
cause the first set of processing engines to execute a first plurality of cooperative thread arrays (CTAs) in parallel to generate first output data, wherein a given task stream in the first plurality of task streams is related to a given set of CTAs in the first plurality of CTAs,
wherein the processing unit causes the PPU to configure the first set of processing engines by:
causing the PPU to configure the first pipestage to include a controller that manages the operation of the first pipestage;
causing the PPU to configure the first pipestage to include a first input storage queue that stores data to be processed by the first plurality of CTAs; and
causing the PPU to allocate task stream data for the given task stream, wherein the task stream data includes a set of functions to be executed by the given set of CTAs.

16. The system of claim 15, further including:
a memory unit coupled to the processing unit and storing program instructions that, when executed by the processing unit, cause the processing unit to:
cause the PPU to configure the first set of processing engines to execute the first pipestage, and
cause the first set of processing engines to execute the first plurality of CTAs in parallel to generate the first output data.

17. The system of claim 15, wherein the processing unit is further configured to:
cause the PPU to configure the given task stream to include one or more tasks, wherein a given task in the one or more tasks is related to a subset of CTAs in the given set of CTAs; and
cause the PPU to allocate task data for the given task in the one or more tasks, wherein the task data allocated for the given task is derived from the task stream data allocated for the given task stream and includes a subset of functions in the set of functions to be executed by the subset of CTAs in the given set of CTAs.

18. A system for executing a processing pipeline within a parallel processing unit (PPU), including:
a processing unit configured to:
cause the PPU to configure a first set of processing engines to execute a first pipestage of the processing pipeline that includes a first plurality of task streams, and
cause the first set of processing engines to execute a first plurality of cooperative thread arrays (CTAs) in parallel to generate first output data, wherein a given task stream in the first plurality of task streams is related to a given set of CTAs in the first plurality of CTAs; and
a memory unit coupled to the processing unit and storing program instructions that, when executed by the processing unit, cause the processing unit to:
cause the PPU to configure the first set of processing engines to execute the first pipestage, and
cause the first set of processing engines to execute the first plurality of CTAs in parallel to generate the first output data.

* * * * *